US010128508B2

(12) United States Patent
Yun et al.

(10) Patent No.: US 10,128,508 B2
(45) Date of Patent: Nov. 13, 2018

(54) POSITIVE ELECTRODE MATERIAL SLURRY FOR LITHIUM SECONDARY BATTERY INCLUDING AT LEAST TWO CONDUCTIVE MATERIALS AND LITHIUM SECONDARY BATTERY USING THE SAME

(71) Applicant: LG Chem, Ltd., Seoul (KR)

(72) Inventors: Hyun Woong Yun, Daejeon (KR); Byung Hun Oh, Daejeon (KR); Eun Kyung Kim, Daejeon (KR)

(73) Assignee: LG Chem, Ltd. (KR)

( * ) Notice: Subject to any disclaimer, the term of this patent is extended or adjusted under 35 U.S.C. 154(b) by 242 days.

(21) Appl. No.: 15/108,526

(22) PCT Filed: Dec. 9, 2015

(86) PCT No.: PCT/KR2015/013449
§ 371 (c)(1),
(2) Date: Jun. 27, 2016

(87) PCT Pub. No.: WO2017/099272
PCT Pub. Date: Jun. 15, 2017

(65) Prior Publication Data
US 2017/0365858 A1    Dec. 21, 2017

(51) Int. Cl.
*H01M 4/62* (2006.01)
*H01M 4/505* (2010.01)
(Continued)

(52) U.S. Cl.
CPC .......... *H01M 4/625* (2013.01); *C01B 32/168* (2017.08); *H01M 4/131* (2013.01); *H01M 4/505* (2013.01);
(Continued)

(58) Field of Classification Search
CPC ...... H01M 4/625; H01M 4/505; H01M 4/525; H01M 10/0525; H01M 2004/028; H01M 4/131; C01B 32/168
See application file for complete search history.

(56) References Cited

U.S. PATENT DOCUMENTS 9,318,783 B2 *  4/2016  Kim ................... H01M 4/8803
2012/0028117 A1  2/2012  Plee et al.
(Continued)

FOREIGN PATENT DOCUMENTS

JP      H-11-345607 A     12/1999
JP      2000058066 A      2/2000
(Continued)

OTHER PUBLICATIONS

Supplementary European Search Report for Application No. EP15871306, dated Oct. 6, 2017.
(Continued)

*Primary Examiner* — Stewart A Fraser
(74) *Attorney, Agent, or Firm* — Lerner, David, Littenberg, Krumholz & Mentlik, LLP

(57) ABSTRACT

Provided is a positive electrode material slurry for secondary battery including a positive electrode active material, a conductive agent, a binder, and a solvent, wherein the conductive agent includes a first conductive agent and a second conductive agent having different particle shapes and sizes.
Since the conductive agent of the present invention may be uniformly dispersed in the positive electrode active material by including a point-type conductive agent, as the first conductive agent, and carbon nanotubes (CNTs) subjected to a grinding process as the linear second conductive agent, conductivity of an electrode to be prepared may be improved
(Continued)

and a secondary battery having improved high-rate discharge capacity characteristics may be provided.

5 Claims, 12 Drawing Sheets

(51) Int. Cl.
| | |
|---|---|
| *H01M 4/525* | (2010.01) |
| *H01M 4/131* | (2010.01) |
| *C01B 32/168* | (2017.01) |
| *H01M 10/0525* | (2010.01) |
| *H01M 10/052* | (2010.01) |
| *B82Y 30/00* | (2011.01) |
| *B82Y 40/00* | (2011.01) |
| *H01M 4/02* | (2006.01) |

(52) U.S. Cl.
CPC ....... *H01M 4/525* (2013.01); *H01M 10/0525* (2013.01); *B82Y 30/00* (2013.01); *B82Y 40/00* (2013.01); *C01B 2202/02* (2013.01); *C01B 2202/04* (2013.01); *C01B 2202/06* (2013.01); *C01B 2202/22* (2013.01); *C01B 2202/34* (2013.01); *H01M 10/052* (2013.01); *H01M 2004/021* (2013.01); *H01M 2004/028* (2013.01); *H01M 2220/20* (2013.01); *Y10S 977/75* (2013.01); *Y10S 977/752* (2013.01); *Y10S 977/842* (2013.01); *Y10S 977/948* (2013.01)

(56) References Cited

U.S. PATENT DOCUMENTS

| | | | |
|---|---|---|---|
| 2012/0244440 A1 | 9/2012 | Lee et al. | |
| 2013/0065125 A1 | 3/2013 | Sawaki et al. | |
| 2015/0171421 A1* | 6/2015 | Akikusa | H01M 4/131 |
| | | | 429/217 |
| 2016/0093913 A1* | 3/2016 | Saito | H01M 4/13 |
| | | | 429/246 |
| 2016/0380270 A1 | 12/2016 | Lee et al. | |
| 2017/0331112 A1 | 11/2017 | Nakamura et al. | |

FOREIGN PATENT DOCUMENTS

| | | |
|---|---|---|
| JP | 2001068093 A | 3/2001 |
| JP | 2003257416 A | 9/2003 |
| JP | 2007080652 A | 3/2007 |
| JP | 2012521065 A | 9/2012 |
| JP | 5216936 B1 | 6/2013 |
| KR | 20050038254 A | 4/2005 |
| KR | 100551005 B1 | 2/2006 |
| KR | 100673987 B1 | 1/2007 |
| KR | 20120108902 A | 10/2012 |
| KR | 20130053015 A | 5/2013 |
| KR | 20150077321 A | 7/2015 |
| WO | 2013179909 A1 | 12/2013 |
| WO | 2016084697 A1 | 6/2016 |

OTHER PUBLICATIONS

International Search Report for Application No. PCT/KR2015/013449 dated Apr. 22, 2016.

* cited by examiner

POSITIVE ELECTRODE MATERIAL SLURRY FOR LITHIUM SECONDARY BATTERY INCLUDING AT LEAST TWO CONDUCTIVE MATERIALS AND LITHIUM SECONDARY BATTERY USING THE SAME

CROSS-REFERENCE TO RELATED APPLICATION

This application is a national phase entry under 35 U.S.C. § 371 of International Application No. PCT/KR2015/013449, filed Dec. 9, 2015, the disclosures of which are incorporated herein by reference.

TECHNICAL FIELD

The present invention relates to a positive electrode material slurry for a lithium secondary battery which includes at least two conductive materials having different particle shapes and sizes, and a lithium secondary battery using the positive electrode material slurry.

BACKGROUND ART

Demand for secondary batteries as an energy source has been significantly increased due to the miniaturization and weight reduction in various electronic devices and the expansion of the electric vehicle market. Among these secondary batteries, lithium secondary batteries having high energy density, high voltage, long cycle life, and low self-discharging rate have been commercialized and widely used. Also, in line with growing concerns about environmental issues, a significant amount of research into electric vehicles and hybrid electric vehicles which may replace vehicles using fossil fuels such as gasoline vehicles and diesel vehicles, one of major causes of air pollution, has been conducted. Recently, research into the use of lithium secondary batteries having high energy density and discharge voltage as power sources of the electric vehicles and hybrid electric vehicles has been actively conducted.

In general, a lithium secondary battery is composed of a structure in which an electrode assembly, which is composed of a positive electrode including a lithium transition metal oxide as an electrode active material, negative electrode including a carbon-based active material, and a porous separator, is impregnated with a lithium electrolyte. In this case, the positive electrode is prepared by coating an aluminum foil with a positive electrode material including the lithium transition metal oxide, and the negative electrode is prepared by coating a copper foil with a negative electrode material including the carbon-based active material.

A conductive agent is added to the positive electrode material and the negative electrode material in order to improve electrical conductivity of the active material. In particular, since the lithium transition metal oxide used as the positive electrode active material has inherently low electrical conductivity, the conductive agent is essentially added to the positive electrode material. Among conductive agents, a chain-type conductive agent is generally used to increase the conductivity of the positive electrode material, wherein the chain-type conductive agent may not increase loading density during a compression process for reducing the thickness of the positive electrode material.

In a high energy density secondary battery, amounts of conductive agent and binder added are limited to increase the amount of a positive electrode active material included in a positive electrode material. In a case in which a large amount of graphitized carbon having insufficient electrical conductive is used as the limited amount of conductive agent, an electrical conductivity deviation occurs in the coated positive electrode material, and this may cause non-uniform performance of cells. The non-uniform performance of the batteries may cause a lot of limitations by causing an abnormal operation of the battery in a medium and large-sized device in which the plurality of batteries is used.

Thus, there is a need to develop a positive electrode material having a new configuration which may improve the above limitations.

PRIOR ART DOCUMENTS

Japanese Patent Application Laid-Open Publication No. 2003-257416

DISCLOSURE OF THE INVENTION

Technical Problem

The present invention provides a positive electrode material slurry for a lithium secondary battery which may improve conductivity of a positive electrode and high rate discharge capacity retention ratio by adding at least two or more heterogeneous conductive materials for the improvement of the performance of the lithium secondary battery, and a method of preparing the same.

The present invention also provides a positive electrode for a lithium secondary battery in which a current collector is coated with the positive electrode material slurry, and a lithium secondary battery including the positive electrode.

Technical Solution

According to an aspect of the present invention, there is provided a positive electrode material slurry for secondary battery including a positive electrode active material, a conductive agent, a binder, and a solvent, wherein the conductive agent includes a nonlinear first conductive agent and a linear second conductive agent.

The nonlinear first conductive agent may include one selected from the group consisting of Denka black and carbon-based materials, such as carbon black, acetylene black, Ketjen black, channel black, furnace black, lamp black, thermal black, and Super-P, and an average particle diameter of the first conductive agent may be in a range of 50 nm to 110 nm.

Also, the linear second conductive agent may be linear carbon nanotubes (CNTs) which are prepared by a wet grinding process, and an average length of the carbon nanotubes may be in a range of 1 μm to 5 μm.

According to another aspect of the present invention, there is provided a method of preparing a positive electrode material slurry for secondary battery including:

mixing an active material, a first conductive agent, and a binder to prepare a mixture;

grinding rope carbon nanotubes to prepare linear carbon nanotubes having an average length of 1 μm to 5 μm; and preparing a positive electrode material slurry by adding the ground carbon nanotubes while stirring the mixture.

The rope carbon nanotubes may include bundle-type carbon nanotubes, in which a plurality of carbon nanotubes is arranged in a linear shape, a curved shape, or a mixed shape thereof, or entangled type carbon nanotubes.

According to another aspect of the present invention, there is provided a positive electrode for a secondary battery, in which a current collector is coated with the positive electrode material slurry of the present invention, and a lithium secondary battery including the positive electrode.

Advantageous Effects

Since a positive electrode material slurry according to the present invention includes at least two conductive agents having different particle shapes and sizes, i.e., a nonlinear first conductive agent and a linear second conductive agent, the two conductive agents may be uniformly dispersed in a positive electrode active material to improve conductivity of an electrode, and high-rate discharge capacity characteristics of a secondary battery may be improved by using the positive electrode material slurry.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Figure 1:
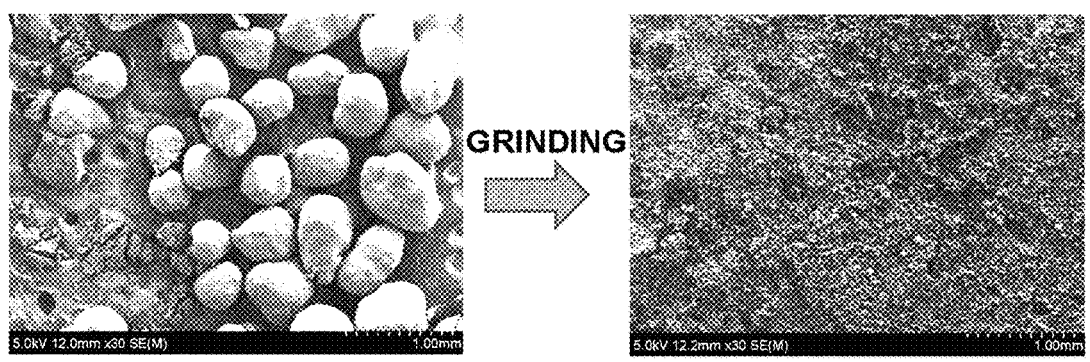
FIG. 1 is SEM images of carbon nanotubes before and after a grinding process.

To solve the above-mentioned problems of the related art and technical problems, the present invention will be described in detail hereinafter.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Typically, since one type of conductive agent was used in a positive electrode material slurry in which a large amount of the conductive agent was required to obtain conductivity of the positive electrode material slurry. As a result, there was a limitation in that an excessive amount of a solvent may not only be used to uniformly mix the conductive agent and a positive electrode active material, but a lot of time was also required in a mixing process. That is, since an average particle diameter of the conductive agent ranges from a few tens to a few hundreds of nanometers (nm) but an average particle diameter ($D_{50}$) of the positive electrode active material is relatively large at a few tens of micrometers (μm), a phenomenon may occur in which the conductive agent may not be uniformly arranged between the positive electrode active materials, but may be agglomerated or may be concentrated in a part due to a difference in sizes or surface areas of positive electrode active material particles and conductive agent particles. This phenomenon remains even if the amount of the conductive agent is increased, and, since resistance may occur due to the excessive amount of the conductive agent, the conductivity may be reduced. Furthermore, an excessive amount of the solvent may be required to improve the mixing process.

In order to improve the limitation, a method has been proposed in which a Li—Co-based composite oxide is included as a positive electrode active material and carbon black having an average particle diameter of 0.5 μm or less and scaly graphitized carbon having an average particle diameter of 1 μm to 6 μm are used as a conductive agent by mixing in a weight ratio of 0.01:1 to 1:1. However, even in this case, a disadvantage of degrading battery characteristics may occur, for example, uniform performance and high-rate discharge characteristics of the positive electrode material are degraded.

Thus, in order to solve the above-mentioned problems and simultaneously achieve the object of the invention, the present invention provides a positive electrode material slurry of a lithium secondary battery, which may improve conductivity of a positive electrode and high rate discharge capacity retention ratio, and a method of preparing the positive electrode material slurry.

Specifically, according to an embodiment of the present invention, there is provided a positive electrode material slurry for secondary battery including a positive electrode active material, a conductive agent, a binder, and a solvent, wherein the conductive agent includes a nonlinear first conductive agent and a linear second conductive agent.

First, in the positive electrode material slurry, known positive electrode active material for a secondary battery may be used as the positive electrode active material. Specifically, the positive electrode active material may include one selected from the group consisting of $LiCoO_2$, $LiNiO_2$, $LiMnO_2$, $LiMn_2O_4$, $Li(Ni_aCo_bMn_c)O_2$ (where $0<a<1$, $0<b<1$, $0<c<1$, and $a+b+c=1$), $LiNi_{1-Y}Co_YO_2$, $LiCo_{1-Y}Mn_YO_2$, $LiNi_{1-Y}Mn_YO_2$ (where $0 \leq Y<1$), $Li(Ni_aCo_b$-

Mn$_c$)O$_4$ (where 0<a<2, 0<b<2, 0<c<2, and a+b+c=2), LiMn$_{2-z}$Ni$_z$O$_4$, and LiMn$_{2-z}$Co$_z$O$_4$ (where 0<z<2), or a mixture of two or more thereof.

Also, the binder is a component that assists in the binding between the positive electrode active material and the conductive agent and in the binding with a current collector. The binder is commonly added in an amount of 1 wt % to 10 wt % based on a total weight of the positive electrode active material, conductive agent, and binder. Examples of the binder may be polyvinylidene fluoride, polyvinyl alcohol, carboxymethylcellulose (CMC), starch, hydroxypropylc 11 lose, regenerated cellulose, polyvinylpyrrolidone, tetrafluorcethylene, polyethylene, Polypropylene, an ethylene-propylene-diene terpolymer (EPDM), a sulfonated EPDM, a styrene butadiene rubber, a fluoro rubber, various copolymers, and the like.

Furthermore, a typical solvent used in a conventionally known positive electrode material slurry may be used as the solvent of the positive electrode material slurry, and specifically, the solvent may include N-methyl pyrrolidone. The solvent may be included in an amount of 70 parts by weight to 80 parts by weight based on a total weight of the positive electrode active material according to an embodiment of the present invention.

The positive electrode material slurry may selectively further include a filler. The filler is a component selectively used to inhibit expansion of the positive electrode. There no particular limit to the filler, so long as it does not cause adverse chemical changes in the batteries and is a fibrous material. Examples of the filler may be olefin-based polymers such as polyethylene and polypropylene; and fibrous materials such as glass fibers and carbon fibers.

Also, in the present invention, in order to provide a positive electrode material having improved conductivity, at least two or more conductive materials (conductive agents) having different particle shapes and sizes may be included so that the conductive agent may be uniformly distributed in the positive electrode material slurry without being concentrated on either side.

Specifically, the conductive agent may include a nonlinear first conductive agent and a linear second conductive agent.

In this case, typical examples of the nonlinear first conductive agent may be a single material selected from the group consisting of carbon black, acetylene black (Denka black), Ketjen black, channel black, furnace black, lamp black, thermal black, and Super-P, or a mixture of two or more thereof.

In particular, particles of the nonlinear first conductive agent may have a shape selected from the group consisting of point, arbitrary, spherical, oval, rectangular, and square shapes, and an average particle diameter (D$_{50}$) of the particles may be in a range of 30 nm to 110 nm, for example, 60 nm to 100 nm. In this case, when the average particle diameter of the first conductive agent is less than nm, since the particle diameter is excessively smal dispersion between the positive electrode active materials may be difficult. When the average particle diameter is greater than 110 nm, since the size is excessively large in terms of the arrangement of the conductive agent according to porosity of the positive electrode active material, the first conductive agent may be agglomerated and may not be uniformly dispersed.

Also, in the positive electrode material slurry for secondary battery of the present invention, linear carbon nanotubes prepared by grinding commercially available carbon nanotubes (CNTs) may be used as the linear second conductive agent.

In this case, the reason for performing a grinding process on the commercially available carbon nanotubes is as follows. Since the commercially available carbon nanotubes are composed of bundle-type carbon nanotubes, in which the plurality of carbon nanotubes are arranged in a linear shape, a curved shape, or a mixed shape thereof, or entangled type carbon nanotubes, an average particle diameter (D$_{50}$) before grinding reaches about 200 µm or more. In a case in which the rope carbon nanotubes are directly used as the second conductive agent without the separate grinding process, filter clogging phenomenon may occur during a process of adding the conductive agent for mixing with the positive electrode material slurry, and the carbon nanotubes (CNTs) having an average particle diameter (D$_{50}$) of 200 µm or more may not be uniformly dispersed during a process of coating the positive electrode with the prepared positive electrode material slurry. Accordingly, the carbon nanotubes (CNTs) in a partially agglomerated state are exposed on the surface of the electrode and the conductive agent may be difficult to function properly in the positive electrode active material.

Thus, in the present invention, in order to use the commercially available carbon nanotubes (CNTs) as the second conductive agent, the commercially available carbon nanotubes may be prepared to have an average length of 1 µm to 5 µm through the grinding process. In this case, when the length of the carbon nanotubes is less than 1 µm, since the carbon nanotubes may not be in the form of a line having a predetermined length, the carbon nanotubes may be difficult to be mixed with the positive electrode material. Thus, an effect of improving the conductivity according to the present invention may be difficult to be obtained. When the length of the carbon nanotubes is 5 µm or more, since the length is excessively large, the carbon nanotubes may not be uniformly dispersed in the positive electrode material slurry. Thus, a deviation in battery performance may be increased.

Furthermore, in the present invention, the carbon nanotubes are obtained by performing a wet grinding method using a high pressure homogenizer. In a case in which a dry grinding method is used instead of the wet grinding method, since the amount of side reactions and the amount of byproducts are large due to the damage to the carbon nanotubes, initial efficiency may be reduced.

in this case, the commercially available carbon nanotubes used in the present invention may be any one selected from the group consisting of single-walled carbon nanotubes composed of a single layer, double-walled carbon nanotubes composed of double layers, and multi-walled carbon nanotubes composed of multiple layers of three or more layers.

Also, the carbon nanotubes may be bundle-type carbon nanotubes in which the plurality of carbon nanotubes is arranged in a linear shape, a curved shape, or a mixed shape thereof, or entangled type carbon nanotubes. Specifically, the entangled type carbon nanotubes may be used. For example, the entangled type carbon nanotubes have low dispersibility than the bundle-type carbon nanotubes, but yield and processability are improved in comparison to the bundle-type carbon nanotubes when the entangled type carbon nanotubes are ground to have an average length of 1 µm to 5 µm to compensate for the low dispersibility. That is, since the entangled type carbon nanotubes are somewhat disentangled in the ash-type from the solid sphere-type while being ground, the same dispersibility as that of the bundle type is observed in the electrode after coating when the entangled type carbon nanotubes are added and mixed in a powder state in a process of preparing the positive electrode material slurry. Thus, uniform distribution may be observed (see FIG. 1).

Therefore, a similar effect of improving the conductivity may be obtained with good productivity (mass production) at a low price.

In the positive electrode material slurry for secondary battery of the present invention, a total amount of the nonlinear first conductive agent and the linear second conductive agent may be in a range of 1 wt % to 5 wt % based on the total weight of the positive electrode active material, conductive agent, and binder. In addition, a weight ratio of the first conductive agent to the second conductive agent in the positive electrode material slurry may be in a range of 1.5:1 to 6:1, preferably 1.5:1 to 3:1.

In a case in which the nonlinear first conductive agent and the linear second conductive agent are mixed in the above weight ratio range, the distribution thereof may be uniform and, as a result, the conductivity may be improved. In a case in which the nonlinear first conductive agent is included in an amount of greater than 3 times the amount of the second conductive agent, uniform dispersion in the positive electrode active material may be obtained, but viscosity of the prepared positive electrode material slurry may increase and the effect of improving the conductivity, which is to be obtained by including two types of conductive agents in the positive electrode material slurry, may be difficult to be obtained because the amount of the second conductive agent was relatively reduced. In particular, in a case in which the nonlinear first conductive agent is included in an amount of less than 1.5 times the amount of the linear second conductive agent as described in the related art, since the uniform dispersion of the linear second conductive agent in the positive electrode material slurry may not be obtained while the dispersibility is relatively reduced, the effect of improving the conductivity may not be expected.

Also, since the positive electrode material slurry of the present invention includes the first conductive agent and the second conductive agent, viscosity for facilitating coating on a positive electrode collector may be obtained while having a higher solid content than a case of using a typical type of conductive agent. Thus, transfer of the positive electrode material slurry is smooth and the positive electrode collector may be more efficiently coated with the positive electrode material slurry.

That is, in a case in which the positive electrode material slurry is prepared by using the first conductive agent and the second conductive agent according to an embodiment of the present invention, since at least two or more conductive agents having different shapes and sizes are mixed and included, the conductive agents may be uniformly dispersed in the positive electrode active material, and thus, a solid content may be increased after the slurry mixing process. That is, the amount of the positive electrode material slurry, which may be produced per unit time, may be increased as the solid content is increased. In general, with respect to the solid content, the weight of the positive electrode active material, conductive agent, and binder may be in a range of 55 wt % to 75 wt % based on the solvent added in the positive electrode material slurry including the positive electrode active material, conductive agent, and binder. In this case, the viscosity of the slurry may increase as the solid content is increased to 75 wt % or more. Since the viscosity of the slurry increases, limitations in terms of ease of transfer and ensuring fluidity during a coating process on the positive electrode collector may occur. Also, in a case in which the solid content is 55 wt % or less, since the viscosity of the prepared positive electrode material slurry may be excessively reduced, the coating on the positive electrode collector may not be easy. Herein, the solid content of 55 wt % to 75 wt % denotes an amount in which viscosity, at which the positive electrode collector may be easily coated with the positive electrode material slurry, for example, a viscosity range of 15,000 cp to 30,000 cp in a room temperature (23° C.) environment, may be obtained.

Thus, the positive electrode material slurry of the present invention may have a viscosity of 15,000 cp to 30,000 cp, and when the viscosity is less than 15,000 cp, since the viscosity is excessively low during the coating on the positive electrode collector, the positive electrode material slurry may be lost or may not be properly applied. Also, when the viscosity is greater than 30,000 cp, a layer may be formed during the coating on the positive electrode collector due to the high viscosity, and a thickness of the positive electrode prepared may be increased.

Furthermore, in the positive electrode material slurry of the present invention, when a degree of dispersion (use Hydro2000, Melvern) was evaluated by measuring a zeta potential of the carbon nanotubes, as the ground second conducive agent, in water, the degree of dispersion of the ground carbon nanotubes measured was in a range of about −35.69 mV to about 33.30 my (0.01% of PVA).

Also, a degree of dispersion of the positive electrode material slurry including the ground carbon nanotubes may be lower than 30 mV or may be greater than 30 mV.

With respect to the degree of dispersion, polarity may be changed depending on a surfactant, and a dispersant may be further added depending on the degree of dispersion. However, a degree of dispersion suitable for an organic solvent (NMP)-based slurry may be ensured even if the dispersant is not further added in the present experiment.

In this case, the zeta potential is a measure indicating colloidal stability of particles in a solvent, wherein a Van der Waals interaction, which allows the colloidal particles dispersed the solvent to be agglomerated, and an electrostatic force generated between the particles and the solvent are balanced. When two particles approach, electrically positive electrode or negative electrode regions formed on the surface of the Particles overlap each other to cause a repulsive force, and since the repulsive force is greater than the Van der Waals interaction, the two particles are not agglomerated but push each other to maintain a stable dispersion state. Thus, it may be considered that a stable state of the particles in the solvent, in which the particles are dispersed, is maintained as the zeta potential is high. In general, in a case in which the zeta potential is greater than a range of −30 mV to 30 mV, it may be considered that the colloidal stability of the particles in the solvent is high.

As described above, in the case that the nonlinear first conductive agent and the linear carbon nanotubes (CNTs), as the second conductive agent, are mixed and included as the conductive agent during the preparation of the positive electrode material slurry for secondary battery in the present invention, since the linear second conductive agent is disposed in a space between the positive electrode active materials and the nonlinear first conductive agent having a smaller average particle diameter is efficiently disposed in a space remaining between the second conductive agent and the positive electrode active material, a phenomenon, which the conductive agents are concentrated in only one part of the positive electrode active material, may be suppressed and the conductive agents may be uniformly dispersed. Furthermore, since the linear carbon nanotubes may also be disposed on a portion, in which the positive electrode active materials are in contact with each other, to reduce pores, the linear carbon nanotubes may improve the conductivity when the linear carbon nanotubes are used in the positive electrode. Therefore, an effect of improving rate characteristics may be obtained by increasing the electrical conductivity and reducing the resistance of the positive electrode material, and, as a result, a capacity retention ratio of the secondary battery prepared may be increased. Also, with respect to the positive electrode material slurry of the present invention, since two conductive agents having different specific surface areas are mixed, the mixing process may be easily performed even if a smaller amount of the solvent is used.

Figure 2:
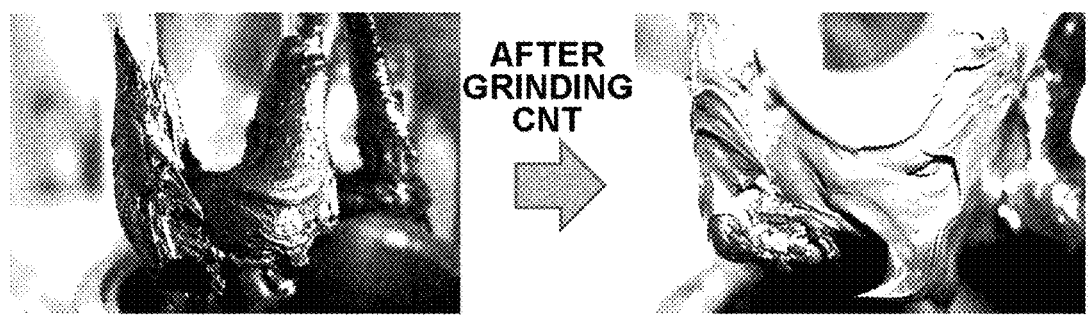
FIG. 2 is SEM images of slurries prepared by using the carbon nanotubes before and after the grinding process.
Figure 3:
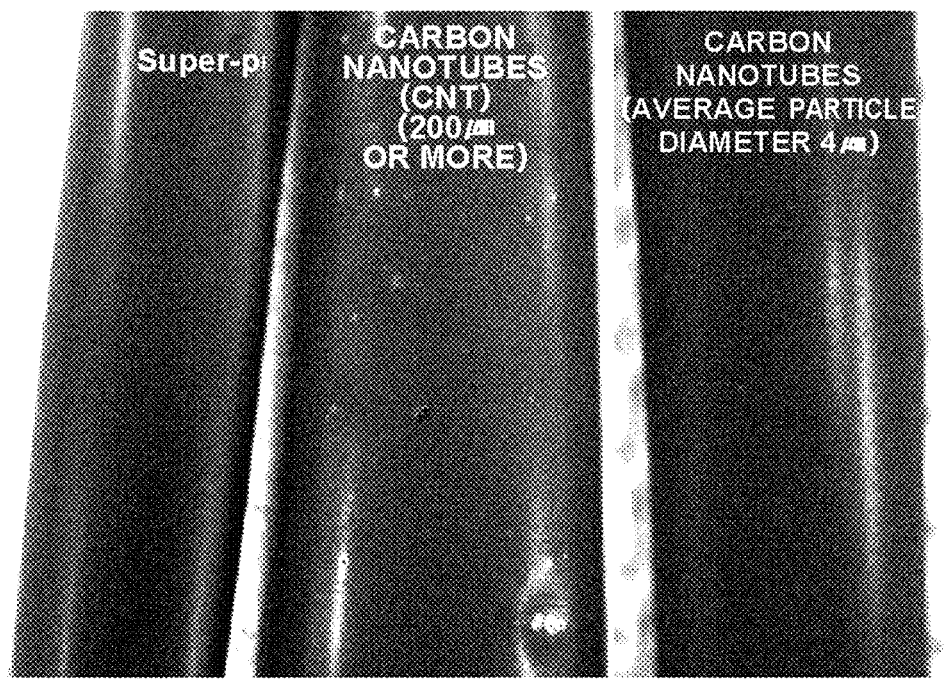
FIG. 3 are images illustrating surfaces of positive electrodes prepared by using the carbon nanotubes before and after the grinding process.

Referring to FIG. 1 as an example of supporting these various effects, it may be confirmed that rope carbon nanotubes (CNTs) became uniform carbon nanotubes (CNTs) after the grinding process. FIG. 2 illustrates positive electrode material slurries respectively including carbon nanotubes (CNTs) having an average particle diameter ($D_{50}$) of 200 μm or more before the grinding and carbon nanotubes (CNTs) having an average length of 1 μm to 3 μm after the grinding, and FIG. 3 illustrates images obtained after each of the slurries was coated on a positive electrode and dried. As illustrated in FIGS. 2 and 3, it may be confirmed that agglomerated portions of the carbon nanotubes (CNTs) having an average particle diameter ($D_{50}$) of 200 μm or more before the grinding appeared on the surface of the positive electrode.

Also, according to an embodiment of the present invention, there is provided a method of preparing a positive electrode material slurry of the present invention including: mixing an active material, a first conductive agent, and a binder to prepare a mixture;

grinding rope carbon nanotubes to prepare linear carbon nanotubes having an average length of 1 μm to 5 μm; and preparing a positive electrode material slurry by adding the ground carbon nanotubes while stirring the mixture, wherein a second conductive agent is the carbon nanotubes.

A method of preparing the mixture is not particularly limited and a known method of preparing a positive electrode material may be used. Specifically, a method may be included in which the positive electrode active material, the binder, the first conductive agent, and the second conductive agent are sequentially added in the solvent and stirred to prepare a positive electrode material slurry.

In particular, a typical grinding method in the art may be used in the grinding of the rope carbon nanotubes in the method of the present invention, and, specifically, the carbon nanotubes (CNTs) may be ground by wet grinding in alcohol (ethanol) using a high pressure homogenizer which may produce physical impacts. The wet grinding process may be performed at 100 rpm to 5,000 rpm for 0.5 hours to 12 hours.

in a case in which carbon nanotubes, which are ground by a dry grinding method different from the above method, are used, since a degree of disentanglement of the bundle and damage to the carbon nanotubes may be changed, the dispersibility may eventually be affected. With respect to the carbon nanotubes subjected to more damage, the initial efficiency and resistance may increase.

The linear carbon nanotubes (CNTs) having an average length of 1 μm to 5 μm may be prepared by grinding the bundle-type or entangled type carbon nanotubes (CNTs) having an average particle diameter ($D_{50}$) of 200 μm or more through the grinding process and then drying the carbon nanotubes for 1 day.

The second conductive agent in the form of powder may be initially mixed with the first conductive agent during the preparation of the positive electrode active material slurry, or may be added to the positive electrode active material slurry after it is dispersed in the reaction solvent in advance.

The present invention also provides a positive electrode for a secondary battery in which the positive electrode material slurry is coated on a current collector.

The positive electrode for secondary battery, for example, may be prepared by coating a positive electrode collector with slurry which is prepared by mixing the positive electrode active material, conductive agent, binder, and filler in a solvent such as N-methyl pyrrolidone (NMP), drying and rolling the anode collector.

The positive electrode collector is generally fabricated to have a thickness of 3 μm to 500 μm. The positive electrode collector is not particularly limited so long as it has high conductivity without causing adverse chemical changes in the batteries, and, for example, stainless steel, aluminum, nickel, titanium, fired carbon, or aluminum or stainless steel that is surface-treated with one of carbon, nickel, titanium, silver, or the like may be used. The collector may have an uneven surface to improve the bonding strength of the positive electrode active material and may have any of various shapes such as that of a film, sheet, a foil, a net, a porous body, a foam body, a non-woven fabric body, and the like.

Also, according to an embodiment of the present invention, there is provided a lithium secondary battery composed of the positive electrode, a negative electrode, a separator, and a lithium salt-containing non-aqueous electrolyte solution.

The negative electrode, for example, is prepared by coating a negative electrode collector with a negative electrode material including a negative electrode active material, a conductive agent, and a binder, and drying the negative electrode collector.

The negative electrode collector is generally fabricated to have a thickness of 3 μm to 500 μm. The negative electrode collector is not particularly limited so long as it has conductivity without causing adverse chemical changes in the batteries, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, like the positive electrode collector, the negative electrode collector may have a fine roughness surface to improve bonding strength with the negative electrode active material. The negative electrode collector may have various shapes such as a film, a sheet, a foil, a net, a porous body, a foam body, a non-woven fabric body, and the like.

As the negative electrode active material, non-limiting examples of a carbon-based material may be a material selected from the group consisting of graphite, graphitizable carbon (softcarbon), non-graphitizable carbon (hard carbon), carbon black, graphene, and graphene oxide, or a mixture of two or more thereof. Specifically, the graphite may include natural graphite or artificial graphite, for example, mesophase carbon microbead (NCNB) or mesophase pitch-based carbon fiber (MPCF).

The conductive agent is commonly added in an amount of 1 wt % to 19 wt % based on 100 wt % of the negative electrode active material layer. Any conductive agent may be used without particular limitation so long as it has suitable conductivity without causing adverse chemical changes in the batteries. For example, the conductive agent may include a conductive material such as: graphite; carbon black such as acetylene black, Ketjen black, channel black, furnace black, lamp black, and thermal black; conductive fibers such as carbon fibers and metal fibers; metal powder such as fluorocarbon powder, aluminum powder, and nickel powder; conductive whiskers such as zinc oxide and potassium titanate; conductive metal oxide such as titanium oxide; or polyphenylene derivatives.

Also, the binder may well bond the negative electrode active materials to each other or may well bond the negative electrode active material with the current collector. Non-limiting examples of the binder may be one selected from the group consisting of polyvinylidenefluoride-co-hexafluoro propylene (PVDF-co-HFP), polyvinylidene fluoride-co-trichloro ethylene, polyvinylidene fluoride-co-chlorotrifluoro ethylene, polymethylmethacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethyl cellulose, cyanoethyl sucrose, pullulan, carboxyl methyl cellulose (CMC), acrylonitrile-styrene-butadiene copolymer, polyimide, polyvinylidenefluoride, and styrene butadiene rubber (SBR), or a mixture of two or more thereof. The binder may be added in an amount of about 0.5 part by weight to about 5 parts by weight, for example, about 1 part by weight to about 3 parts by weight, based on 100 parts by weight of a negative electrode active material mixture.

Also, the negative electrode may further include a thickener. The thickener may be added to improve rheological properties of the conductive agent, and is also referred to as "rheological control agent". Non-limiting examples of the thickener may be one selected from the group consisting of cellulose, urethane, curdlan (or beta-1,3-glucan), tamarind, gelatin, gua gum, pectin, locust bean gum (LBG) (or carob beangum), carrageenan, alginic acid, arabic gum, and zanthan, or a mixture of two or more thereof. Examples of the cellulose thickener among these thickeners may be one selected from the group consisting of carboxylmethyl cellulose (CMC), methyl cellulose (MC), hydroxypropyl cellulose (HPC), methyl hydroxypropyl cellulose (MHPC), ethyl hydroxyethyl cellulose (EHEC), methyl ethyl hydroxyethyl cellulose (MEHEC), and cellulose gum, or a mixture of two or more thereof, but the preset invention is not limited thereto. The thickener may be included in an amount of about 0.5 part by weight to about 3 parts by weight, for example, about 1 part by weight to about 2 parts by weight, based on 100 parts by weight of the negative electrode active material mixture.

The separator is disposed between the positive electrode and the negative electrode, and a thin insulating film having high ion permeability and mechanical strength is used. The separator typically has a pore diameter of 0.01 μm to 10 μm and a thickness of 5 μm to 300 μm. For example, sheets or non-woven fabrics formed of an olefin-based polymer such as polypropylene; glass fibers or polyethylene, which have chemical resistance and hydrophobicity, are used as the separator. When a solid electrolyte, such as a polymer, is used as an electrolyte, the solid electrolyte may also serve as the separator.

The lithium salt-containing non-aqueous electrolyte solution composed of a non-aqueous electrolyte and a lithium salt. A non-aqueous organic solvent, an organic solid electrolyte, and an inorganic solid electrolyte may be used as the non-aqueous electrolyte solution.

Examples of the non-aqueous organic solvent may be aprotic organic solvents, such as N-methyl-2-pyrrolidone, propylene carbonate, ethylene carbonate, butylene carbonate, dimethyl carbonate, diethyl carbonate, y-butyrolactone, 1,2-dimethoxy ethane, tetrahydroxy franc, 2-methyl tetrahydrofuran, dimethyl sulfoxide, 1,3-dioxolane, formamide, dimethylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate.

Examples of the organic solid electrolyte may be a polyethylene derivative, a polyethylene oxide derivative, a polypropylene oxide derivative, a phosphate ester polymer, poly agitation lysine, polyester sulfide, polyvinyl alcohol, polyvinylidene fluoride, and a polymer containing an ionic dissociation group.

Examples of the inorganic solid electrolyte may be nitrides, halides, and sulfates of lithium (Li), such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the non-aqueous electrolyte, and, for example, $LiPF_6$, $LiAsF_6$, $LiCF_3SO_3$, $LiN(CF_3SO_2)_2$, $LiBF_4$, $LiBF_6$, $LiSbF_6$, $LiN(C_2F_5SO_2)_2$, $LiAlO_4$, $LiAlCl_4$, $LiSO_3CF_3$, $LiClO_4$, $Li(CF_3CO_2)$, $Li(CF_3SO_2)(C_2F_5SO_2)$, and $Li(SO_2F)_2N$ may be used as the lithium salt.

Also, in order to improve charge/discharge characteristics and flame retardancy, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, and aluminum trichloride, for example, may be added to the non-aqueous electrolyte solution. In some cases, halogen-containing solvents, such as carbon tetrachloride and ethylene trifluoride, may be further included in order to impart incombustibility, and carbon dioxide gas may be further included in order to improve high-temperature storage characteristics.

The secondary battery according to the present invention may not only be used in a battery cell used as a power source of a small device, but may also be used as a unit cell in a medium and large-sized battery module including a plurality of battery cells Preferred examples of the medium and large-sized device may be a power tool; an electric vehicle (EV) including an electric car, a hybrid electric vehicle (HEV), and a plug-in hybrid electric vehicle (PHEV); an electric two-wheeled vehicle including an E-bike and an E-scooter; an electric golf cart; an electric truck; an electric commercial vehicle; or a power storage system, but the medium and large-sized device is not limited thereto.

Hereinafter, the present invention will be described in more detail, according to examples. However, the following examples are merely presented to exemplify the present invention, and the scope of the present invention is not limited thereto.

EXAMPLES

Example 1

<Carbon Nanotube Preparation>

A wet grinding process was performed on rope (entangled-type) carbon nanotubes having an average particle diameter of 200 μm using a high pressure homogenizer at a speed of 1,000 rpm for 3 hours. Subsequently, linear carbon nanotubes (CNTs) having an average length of 4 μm were prepared by drying the carbon nanotubes for one day.

<Preparation of Positive Electrode Material Slurry>

2 wt % of Super-P having an average particle diameter of 50 nm, as a first conductive agent, and 2 wt % of polyvinylidene fluoride (PVdF) as a binder were dissolved in an N-methyl-2-pyrrolidone (NMP) solvent, and 93 wt % of $LiNi_{0.6}Co_{0.2}Mn_{0.2}O_2$, as a positive electrode active material was then added and mixed to prepare a positive electrode active material slurry.

Subsequently, 2 wt % of the PVdF binder was further added while stirring the positive electrode active material slurry, and 1 wt % (conductive agent weight ratio 2:1) of the ground linear carbon nanotubes having an average length of 4 μm, as a second conductive agent, which were dissolved in the N-methyl-2-pyrrolidone (NMP) solvent, were added and stirred to prepare a positive electrode material slurry. In this case, it was desirable to control a solid content in the positive electrode material slurry to be in a range of about 60% to about 70% by adjusting the amount of the reaction solvent when the second conductive agent was added.

<Preparation of Lithium Secondary Battery>

An about 20 μm thick aluminum (Al) thin film as a positive electrode collector was coated with the prepared positive electrode material slurry and dried, and the Al thin film was then roll-pressed to prepare a positive electrode.

A negative electrode mixture slurry was prepared by adding 96 wt % of carbon powder as a negative electrode active material, 3 wt % of PVdF as a binder, and 1 wt % of carbon black as a conductive agent to NMP as a solvent. A 10 μm thick copper (Cu) thin film as a negative electrode collector was coated with the negative electrode mixture slurry and dried, and the Cu thin film was then roll-pressed to prepare a negative electrode.

A polymer type battery was prepared by a typical method using a separator formed of three layers of polypropylene/polyethylene/polypropylene (PP/PE/PP) with the positive electrode and negative electrode thus prepared, and a lithium secondary battery was then completed by injecting a non-aqueous electrolyte solution in which a non-aqueous organic solvent having a composition, in which a volume ratio of ethylene carbonate (EC):ethylmethyl carbonate (EMC):dimethyl carbonate (DMC) was 3:3:4, and 1 mole/l of $LiPF_6$, as a lithium salt, based on a total weight of the non-aqueous electrolyte solution were added.

Example 2

A lithium secondary battery was prepared in the same manner as in Example 1 except that a negative electrode mixture slurry was prepared by adding 95.5 wt % of carbon powder as a negative electrode active material, 2 wt % of carbon black as a conductive agent, wt % of CMC as a thickener, and 1.5 wt % of SBR, as a binder, to NMP as a solvent in the preparation of the lithium secondary battery.

Comparative Example 1

A positive electrode material slurry and a lithium secondary battery using the same were prepared in the same manner as in Example 1 except that a second conductive agent was not included and 3 wt % of Super-P having an average particle diameter of 50 nm was only added as a conductive agent.

Comparative Example 2

A positive electrode material slurry and a lithium secondary battery using the same were prepared in the same manner as in Example 1 except that 1 wt % of CNTs having an average particle diameter ($D_{50}$) of 200 μm, which were not subjected to a grinding process, was added as a second conductive agent.

Comparative Example 3

A positive electrode material slurry and a lithium secondary battery using the same were prepared in the same manner as in Example 1 except that 1 wt % of fine carbon nanotubes having an average length of 0.5 μm was added as a second conductive agent.

Comparative Example 4

A positive electrode material slurry and a lithium secondary battery using the same were prepared in the same manner as in Example 1 except that 2.5 wt % of Super-P having an average particle diameter of 50 nm, as a first conductive agent, and 0.5 wt % (conductive agent weight ratio=5:1) of the carbon nanotubes having an average length of 4 μm prepared in Example 1, as a second conductive agent, were added.

Comparative Example 5

A positive electrode material slurry and a lithium secondary battery using the same were prepared in the same manner as in Example 1 except that 1.5 wt % of Super-P having an average particle diameter of 50 nm, as a first conductive agent, and 1.5 wt % (conductive agent weight ratio=1:1) of the carbon nanotubes having an average length of 4 μm prepared in Example 1, as a second conductive agent, were added.

Comparative Example 6

A positive electrode material slurry and a lithium secondary battery using the same were prepared in the same manner as in Example 1 except that I wt % of fine carbon nanotubes having an average length of 6 μm was added as a second conductive agent.

<SEM Microscopy>

FIGS. 4 to 8 illustrate scanning electron microscope (SEM) images of particle morphologies of the positive electrode material slurries of Comparative Examples 1 to 4 and Example 1 at ×5,000 magnification. Herein, the length of scale bar represents 10 μm.

Figure 4:
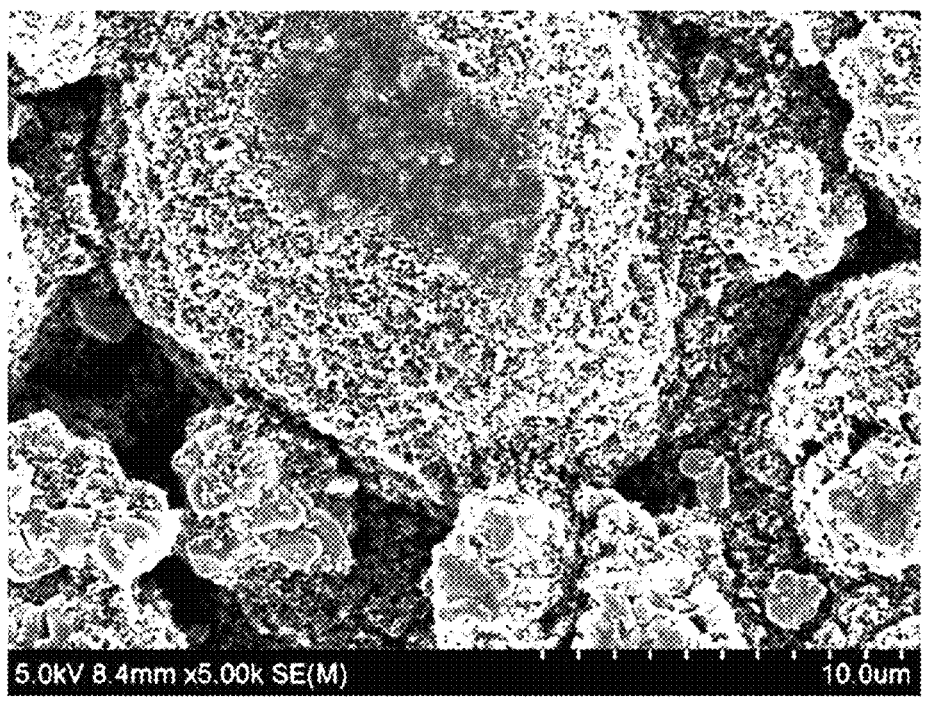
FIG. 4 is a scanning electron microscope (SEM) image of a positive electrode active material slurry obtained in Comparative Example 1.

As illustrated in FIG. 4, with respect to Comparative Example 1, it may be confirmed that a space between the positive electrode active materials was not Partially filled due to characteristics of Super-P as a fine point-type conductive agent.

Figure 5:
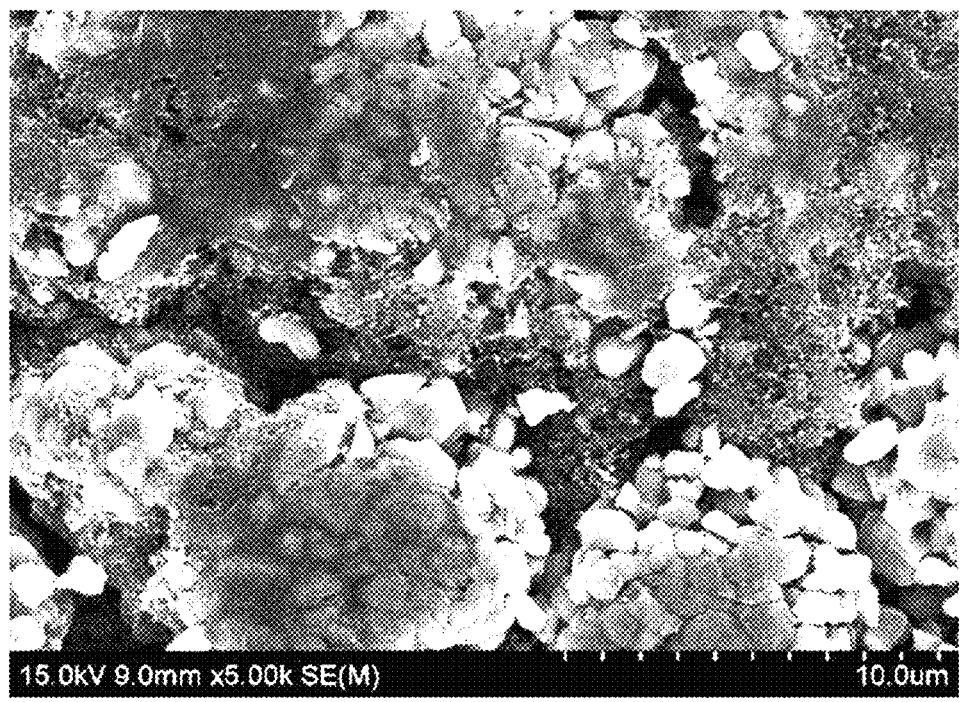
FIG. 5 is an SEM image of a positive electrode active material slurry obtained in Comparative Example 2.

As illustrated in FIG. 5, with respect to Comparative Example 2, it may be confirmed that a phenomenon, in which Super-P, as a point-type conductive agent, and carbon nanotubes were not well dispersed and concentrated on one side, was observed due to the carbon nanotubes having a length of 200 μm which were not subjected to the grinding process.

Figure 6:
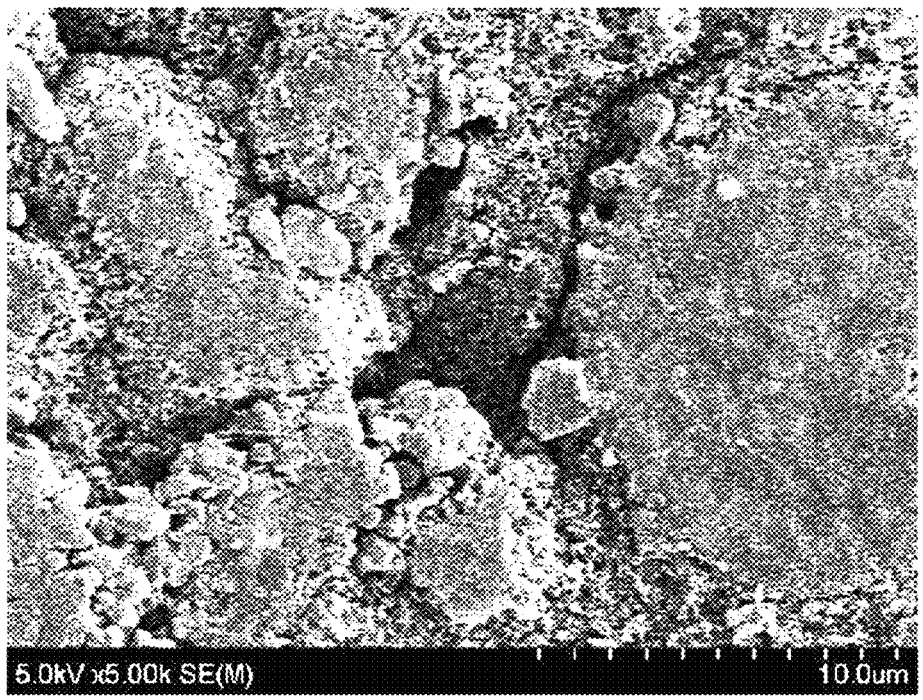
FIG. 6 is an SEM image of a positive electrode active material slurry obtained in Comparative Example 3.

As illustrated in FIG. 6, with respect to Comparative Example 3, it may be confirmed that a space between the positive electrode active materials is not partially filled due to the fine second conductive agent.

Figure 7:
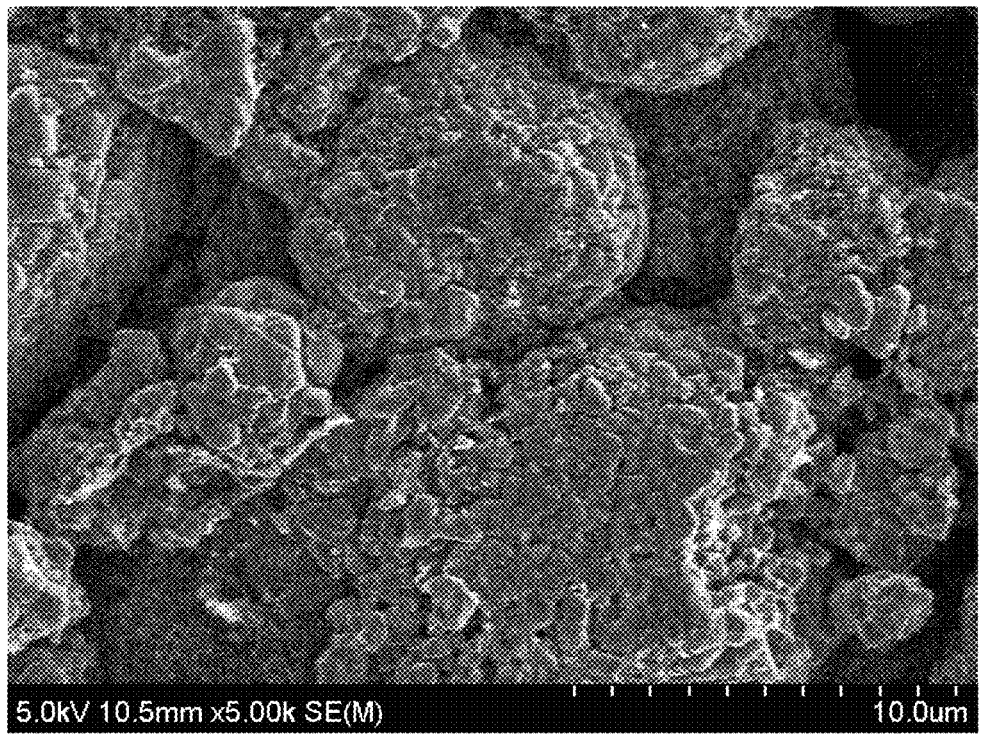
FIG. 7 is an SEM image of a positive electrode active material slurry obtained in Comparative Example 4.

As illustrated in FIG. 7, with respect to Comparative Example 4, it may be confirmed that a phenomenon in which carbon nanotubes were not well dispersed and concentrated on one side, was observed due to the first conductive agent contained in a large amount.

Figure 8:
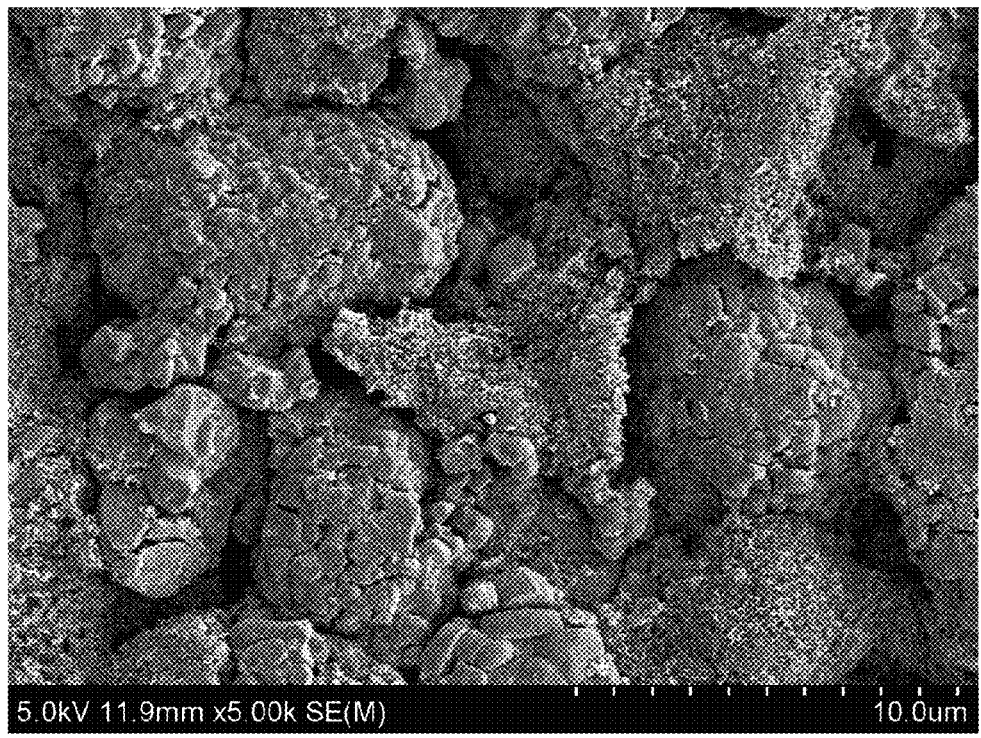
FIG. 8 is an SEM image of a positive electrode active material slurry obtained in Example 1.

As illustrated in FIG. 8, in a case in which the carbon nanotubes having an average length of 4 µm and subjected to the grinding process, according to the embodiment of the present invention, were included, it may be confirmed that two conductive agents were uniformly distributed on the surface of the positive electrode active material and a space between the positive electrode active materials is efficiently filled in comparison to Comparative Example 1.

Experimental Example

The secondary batteries prepared in Example 1 and Comparative Examples 1 to 6 were discharged under 0.2 C, 1 C, 2 C, and 5 C discharge conditions to mutually compare discharge capacities, and the results thereof are presented in the following Table 1 and FIGS. 9 to 12. In the following Table 1, the capacities under other discharge conditions were represented as relative values based on the 0.2 C discharge condition (100).

Figure 9:
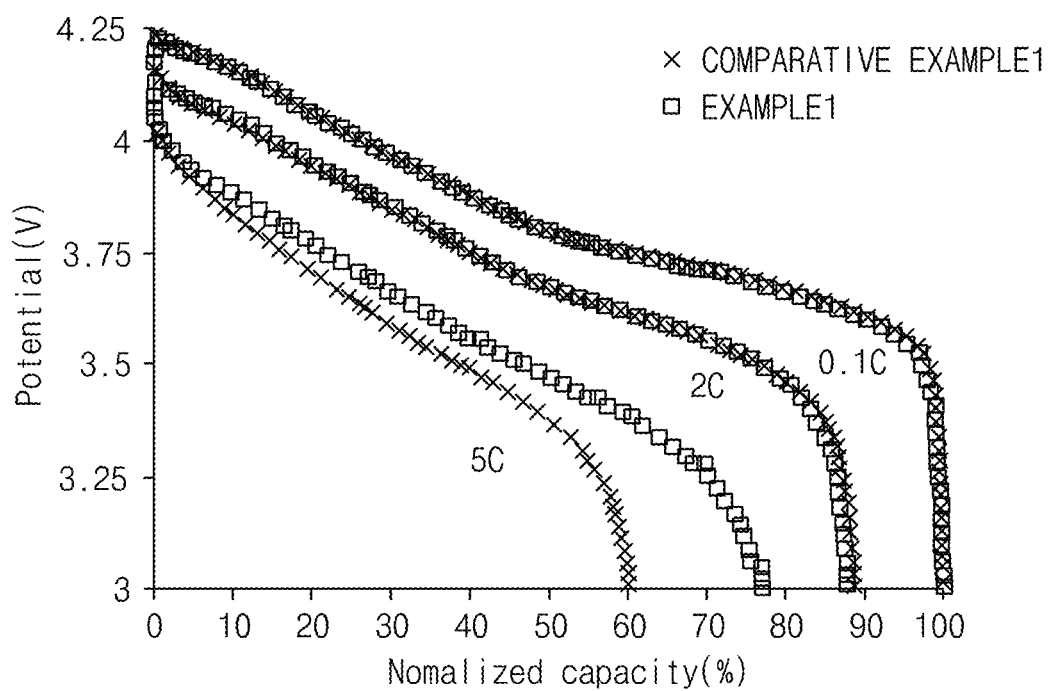
FIG. 9 is a graph illustrating changes in discharge capacities of a battery of Example 1 and a battery of Comparative Example 1 under 0.1 C, 2 C, and 5 C discharge conditions.

FIG. 9 illustrates discharge curves of the secondary batteries of Example 1 and Comparative Example 1 at 0.1 C, 2 C, and 5 C rates, respectively.

Figure 10:
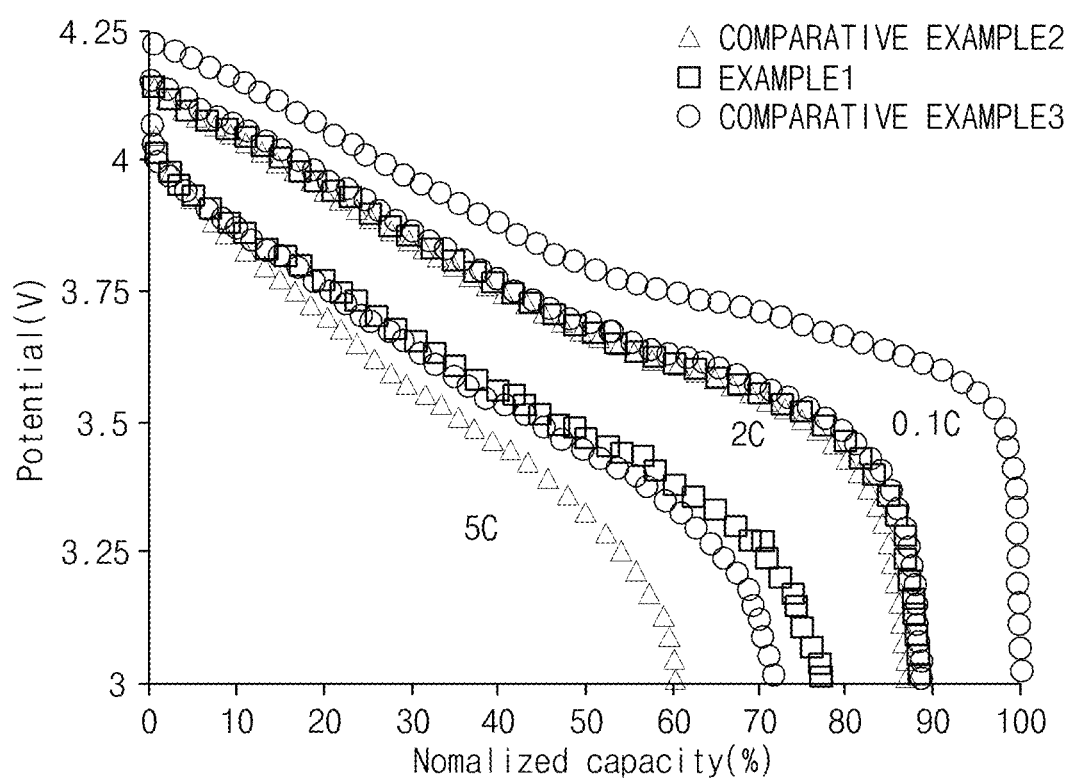
FIG. 10 is a graph illustrating changes in discharge capacities of the battery of Example 1 and batteries of Comparative Examples 2 and 3 under 0.1 C, 2 C, and 5 C discharge conditions.

FIG. 10 illustrates discharge curves of the secondary batteries of Example 1 and Comparative Examples 2 and 3 at 0.1 C, 2 C, and 5 C rates, respectively.

Figure 11:
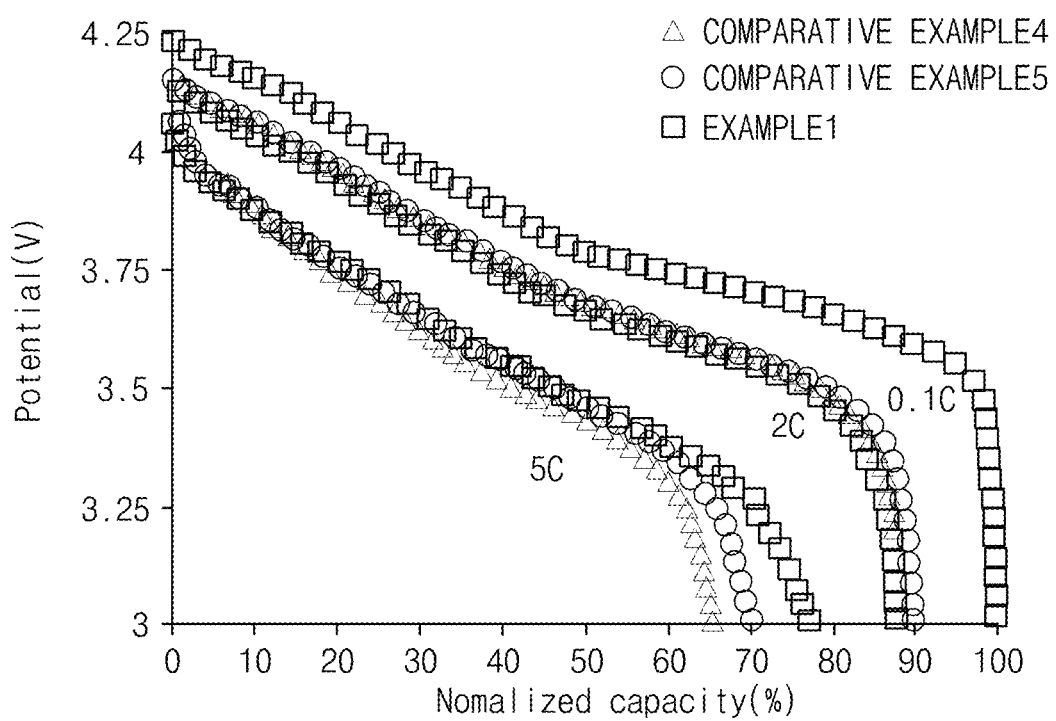
FIG. 11 is a graph illustrating changes in discharge capacities of the battery of Example 1 and batteries of Comparative Examples 4 and 5 under 0.1 C, 2 C, and 5 C discharge conditions.

FIG. 11 illustrates discharge curves of the secondary batteries of Example 1 and Comparative Examples 4 and 5 at 0.1 C, 2 C, and 5 C rates, respectively.

Figure 12:
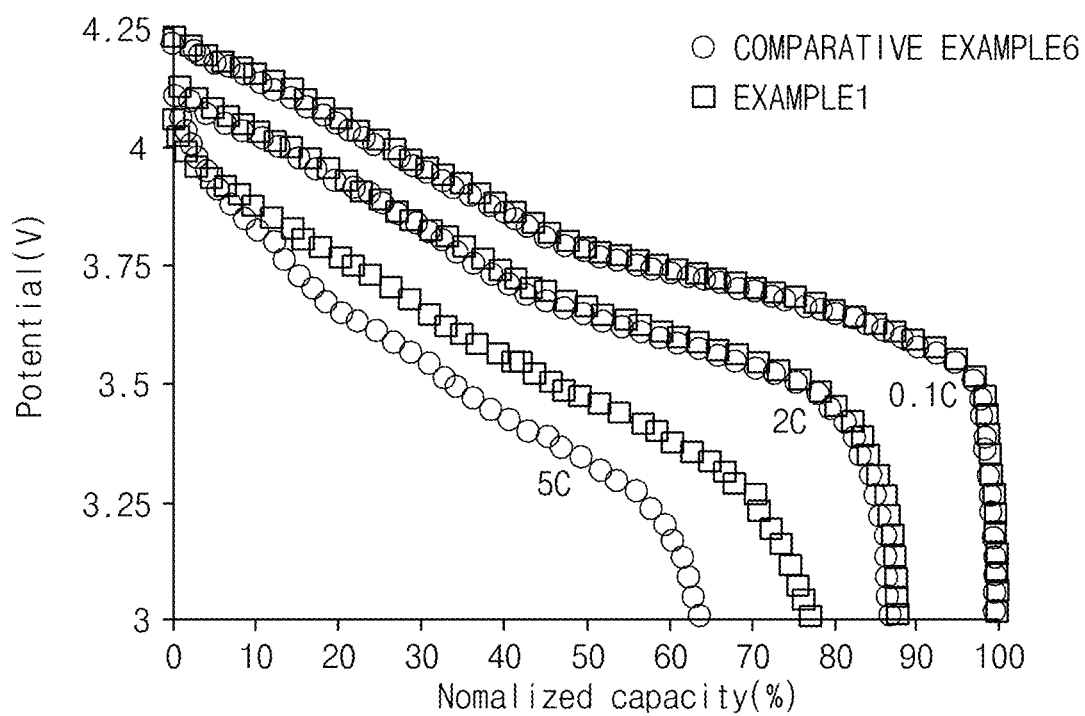
FIG. 12 is a graph illustrating changes in discharge capacities of the battery of Example 1 and a battery of Comparative Example 6 under 0.1 C, 2 C, and 3 C discharge conditions.

FIG. 12 illustrates discharge curves of the secondary batteries of Example 1 and Comparative Example 6 at 0.1 C, 2 C, and 5 C rates, respectively.

TABLE 1

| Capacity retention ratio (%) | 0.1 C capacity retention ratio (%) | 1 C capacity retention ratio (%) | 2 C capacity retention ratio (%) | 5 C capacity retention ratio (%) |
|---|---|---|---|---|
| Example 1 | 100 | 92.1 | 88.4 | 78.1 |
| Comparative Example 1 | 100 | 91.8 | 89.0 | 60.7 |
| Comparative Example 2 | 100 | 90.1 | 86.7 | 53.4 |
| Comparative Example 3 | 100 | 90.5 | 88.1 | 72.1 |
| Comparative Example 4 | 100 | 91.8 | 88.3 | 66.5 |
| Comparative Example 5 | 100 | 91.0 | 88.0 | 69.6 |
| Comparative Example 6 | 100 | 90.5 | 87.5 | 63.5 |

Referring to Table 1 and FIGS. 9 to 12, the discharge capacities tended to generally decrease as the discharge rate increased. However, at a high discharge rate of 2 C or more, the battery of Example 1 according to the present invention exhibited better discharge capacity than the batteries of Comparative Examples 1 to 6, and, particularly, it may be understood that the difference in discharge capacity was significantly increased at a high discharge rate of 5 C or more as the discharge rate increased.

With respect to the secondary battery including the non-linear first conductive agent and the second conductive agent using linear carbon nanotubes having an average length of 1 µm to 5 µm according to the present invention, it may be understood that the high rate discharge capacity retention ratio was improved due to the improvement in conductivity of the positive electrode active material.

While the present invention has been shown and described in connection with the exemplary embodiments, it will be apparent to those skilled in the art that modifications and variations can be made without departing from the spirit and scope of the invention as defined by the appended claims.

The invention claimed is:

1. A method of preparing a positive electrode material slurry for a secondary battery, the method comprising:
    mixing an active material, a conductive agent, and a binder to prepare a mixture;
    grinding rope carbon nanotubes to prepare linear carbon nanotubes having an average length of 1 µm to 5 µm to form ground carbon nanotubes; and
    preparing a positive electrode material slurry by dispersing the ground carbon nanotubes while stirring the mixture.

2. The method of claim 1, wherein the rope carbon nanotubes comprise any one selected from the group consisting of single-walled carbon nanotubes composed of a single layer, double-walled carbon nanotubes composed of double layers, and multi-walled carbon nanotubes composed of multiple layers of three or more layers.

3. The method of claim 1, wherein the rope carbon nanotubes comprise bundle-type carbon nanotubes, in which a plurality of carbon nanotubes is arranged in a linear shape, a curved shape, or a mixed shape thereof, or entangled type carbon nanotubes.

4. The method of claim 1, wherein the grinding is performed by using a wet grinding method.

5. The method of claim 1, wherein the wet grinding method is performed using a high pressure homogenizer at a speed of 100 rpm to 5,000 rpm for 0.5 hours to 12 hours.

* * * * *